(12) United States Patent
Abukawa

(10) Patent No.: US 6,410,121 B1
(45) Date of Patent: Jun. 25, 2002

(54) CERMET TOOL AND METHOD FOR MANUFACTURING THE SAME

(75) Inventor: Kohei Abukawa, Aichi (JP)

(73) Assignee: NGK Spark Plug Co. Ltd., Aichi (JP)

( * ) Notice: Subject to any disclaimer, the term of this patent is extended or adjusted under 35 U.S.C. 154(b) by 0 days.

(21) Appl. No.: 09/513,171

(22) Filed: Feb. 25, 2000

(30) Foreign Application Priority Data

Feb. 26, 1999 (JP) .............................................. 11-051516
Feb. 4, 2000 (JP) ........................................ 2000-028245

(51) Int. Cl.[7] .............................................. C22C 29/00
(52) U.S. Cl. .......................... 428/195; 51/309; 428/212; 428/336; 428/472; 428/697; 428/698; 428/699
(58) Field of Search ................................. 428/195, 472, 428/697, 698, 699, 336, 212; 51/309

(56) References Cited

U.S. PATENT DOCUMENTS

| | | | |
|---|---|---|---|
| 4,643,620 A | * | 2/1987 | Fujii et al. .................. 407/119 |
| 5,431,072 A | * | 7/1995 | Christoffel .................... 76/115 |
| 5,484,468 A | * | 1/1996 | Ostund et al. ................. 75/236 |
| 5,776,588 A | * | 7/1998 | Moriguchi et al. ......... 428/698 |
| 5,897,272 A | * | 4/1999 | Wiman et al. .............. 407/119 |

FOREIGN PATENT DOCUMENTS

EP 0413227 * 2/1991

* cited by examiner

Primary Examiner—Archene Turner
(74) Attorney, Agent, or Firm—Sughrue Mion, PLLC

(57) ABSTRACT

A cermet tool 1 having a hard layer 11 which is very hard and which covers the surface of the tool 1, and an interior portion 13 which is covered with and softer than the hard layer 11. A nose 7, which comes into contact with a workpiece during cutting, is formed at a corner of the cermet tool 1. The tip of the nose 7 is radiused by honing to a curvature having a radius of 0.04 mm to 0.16 mm so as to form a radiused portion 15 where the interior portion 13 of the tool 1 is exposed. Accordingly, the hard layer 11 is disposed around the radiused portion (exposure portion) 15, and provides a cermet tool having excellent resistance to chipping and wear.

5 Claims, 7 Drawing Sheets

PRIOR ART

CERMET TOOL AND METHOD FOR MANUFACTURING THE SAME

BACKGROUND OF THE INVENTION

1. Field of the Invention

The present invention relates to a cermet tool capable of, for example, cutting steel at high speed, and to a method for manufacturing the same.

2. Description of the Related Art

Conventionally, as described in, for example, Japanese Patent Application Laid-Open (kokai) No. 9-104943, a cermet tool is used for cutting steel. Cermet is a sintered hard alloy made of a bonding-phase metal of the iron group, such as Ni, and a hard-phase material, such as TiCN.

A sintered skin which has been formed during sintering may remain on the surface of a cermet tool of this type. Conventionally, exudation of a bonding-phase metal, such as Ni, into the sintered skin is observed. In the case where a bonding-phase metal has exuded into the sintered skin, the exuded bonding-phase metal and a workpiece material often fuse together, thereby imposing excessive cutting resistance on the cutting edge of the tool with resultant chipping of the cutting edge.

To cope with this problem, as shown in FIG. 8, a hard layer P2 harder than an interior portion P1 of a cermet tool is formed on the surface of the tool (the composition of the hard layer P2 differs from that of the interior portion P1).

The amount of a bonding-phase metal contained in the hard layer P2 is less than that contained in the interior portion P1 of the tool (i.e., the hard layer P2 has a higher hard-phase material content). Through formation of such a hard layer P2 on the surface of the tool, resistance of the tool to wear and chipping is improved.

By employing the hard layer P2, wear resistance is improved. Also, by reducing the amount of the bonding-phase metal contained in the hard layer P2 (the bonding-phase metal potentially causes fusion), fusion is prevented, to thereby improve resistance to chipping.

The above-described prior art techniques can improve resistance to wear and chipping to a certain extent, but not to a sufficient extent.

Specifically, since the coefficient of thermal expansion of the bonding-phase metal, such as Ni, differs significantly from that of the hard-phase material, such as TiCN, contained in a large amount in the hard layer P2, the cutting edge of the tool tends to chip during machining which involves great temperature variations and a heavy thermal load.

SUMMARY OF THE INVENTION

The present invention has been achieved in view of the above problems. It is therefore an object of the present invention to provide a cermet tool having excellent resistance to chipping and wear as well as to provide a method for manufacturing the same.

Accordingly, the present invention provides a cermet tool comprising a hard layer formed on a surface thereof, characterized in that an exposure portion is formed at a nose so as to expose an interior portion of the tool and in that the hard layer is disposed around the exposure portion.

According to the present invention, as shown in FIG. 1, the exposure portion where an interior portion of the cermet tool is exposed is formed at the nose of the tool (through, for example, radiusing), and the hard layer is disposed around the radiused portion. FIG. 1 shows a cermet tool assuming substantially the form of a rectangular parallelepiped (negative tip) as viewed from above the rake face, in which the hard layer located on the rake-face side is removed.

Accordingly, when a workpiece is to be machined by the nose of the cermet tool, the exposure portion, which is softer than the hard layer and has toughness, is brought into contact with the workpiece. Therefore, even when a large force is imposed on the nose, the nose is less likely to chip. The exposure portion is surrounded by the hard layer, which is harder than the interior portion of the tool. Therefore, even when cutting chips hit the hard layer during cutting, the hard layer does not wear significantly.

Since the cermet tool of the present invention has an exposure portion, where the interior portion of the tool is exposed, and a hard layer disposed around the radiused portion, the tool exhibits excellent resistance to chipping and wear.

In the present invention, the term "cermet" means a sintered hard alloy comprising at least a hard-phase material such as TiCN, and a bonding-phase metal of the iron family such as Ni; and the term "cermet tool" means a tool formed of such an alloy.

Preferably, the exposure portion is a radiused portion or rather circular arc or a chamfered portion formed such that an interior portion of the tool is exposed. Preferably the exposure portion is formed at a corner portion (nose) of the tool.

Preferably, the radius of the radiused portion is 0.04 mm to 0.16 mm. By employing a specified radius, the radiused portion can be exposed appropriately by polishing the nose. Thus, the nose is less likely to chip during cutting, thereby enabling favorable cutting.

Preferably, the thickness of the hard layer is 2 $\mu$m to 20 $\mu$m. By employing the specified thickness, the hard layer is appropriately disposed around the radiused portion when the radiused portion is to be exposed by polishing the nose. Thus, the nose becomes less likely to wear during cutting, thereby enabling favorable cutting.

When the thickness of the hard layer is not less than 2 $\mu$m, the hard layer provides a sufficient wear resistance effect. When the thickness of the hard layer is not greater than 20 $\mu$m, the radiused portion can be easily exposed by radiusing in a conventionally employed range.

Particularly, when the radius of the radiused portion is 0.04 mm to 0.16 mm and the thickness of the hard layer is 2 $\mu$m to 20 $\mu$m, the radiused portion can be readily formed at the nose by radiusing such that the interior portion of the tool is exposed to an appropriate extent.

Advantageously, the tool contains as a bonding phase at least two iron-group metals and contains as a hard phase at least two members selected from the group consisting of carbides, nitrides, and carbonitrides of elements in Groups 4A, 5A and 6A of the periodic table.

As schematically shown in FIG. 2, a cermet tool comprises a hard phase which contains hard grains, such as TiCN; a bonding phase composed of bonding-phase metals and a binder; and a solid solution composed of bonding-phase and hard-phase components. The present invention specifies advantageous compositions of the cermet tool.

Examples of the iron-group metals include Ni, Co, and Fe.

Examples of carbides, nitrides, and carbonitrides of elements in Groups 4A, 5A, and 6A include TiC, which is a carbide of a Group 4A element; TiN, which is a nitride of a Group 4A element; TiCN, which is a carbonitride of a Group 4A element; VC, NbC and TaC, which are carbides of Group 5A elements; and $Mo_2C$ and WC, which are carbides of Group 6A elements.

Preferably, substantially no exudation of bonding-phase metals into the sintered skin of the cermet tool is observed.

When no exudation of bonding-phase metals into the sintered skin of the cermet tool is observed, the cutting edge of the tool and a workpiece material are less likely to fuse together, thereby preventing chipping of the cutting edge, which would otherwise result from fusion.

A degree which corresponds to substantially no exudation of bonding-phase metals being observed may be equivalent, for example, to a bonding-phase-metal content of not greater than 1.9% by weight as measured by means of an SEM (an energy dispersive X-ray analyzer attached to a scanning electron microscope). Since measurement of a bonding-phase-metal content by means of the SEM covers not only the surface of the sintered skin but also a small distance into the interior portion of the skin, the bonding-phase metal content of not greater than 1.9% by weight may be considered to indicate substantially no exudation of bonding-phase metals being observed.

Preferably, when the amount of bonding-phase metals as measured substantially at a center of the interior portion of the tool is taken as 100% by weight, the amount of bonding-phase metals contained in the hard layer is not greater than 11% by weight. Accordingly, the hard layer can be defined by the amount of bonding-phase metals contained in the hard layer.

When the bonding-phase-metal content of the hard layer is not greater than 11% by weight, the amount of bonding-phase metals which are present in the vicinity of the surface of the sintered skin and which are potentially exuded into the sintered skin is small. Thus, fusion is less likely to occur, thereby imparting excellent resistance to chipping.

When bonding-phase metals are contained in excess of 11% by weight, the cutting edge of the tool will chip due to fusion. This has been experimentally confirmed, as described below. When the hard layer of such a composition has a thickness of 2 μm to 20 μm, excellent wear resistance is achieved.

"A center of the interior portion of the tool" is a position where the amount of bonding-phase metals is measured for use as a reference in compositional comparison, since variation in composition at such a portion is small.

Preferably, a sintered skin is present on a flank and/or rake face of the cermet tool.

When the sintered skin remains on the surface of the tool; for example, when the surface of the hard layer retains a sintered skin formed during sintering, application of a surface treatment, such as coating, to the tool can be omitted, thereby effecting an advantage in terms of cost.

The invention also provides a method for manufacturing a cermet tool, characterized as comprising: sintering a cermet material compact; and lowering the temperature of a resultant sintered body under a reduced pressure, preferably in the range of from 5 Torr to 50 Torr, in a nitrogen atmosphere for 15 to 25 minutes.

In the present specification, a pressure of 1 Torr is understood to be approximately 130 Pa.

According to the manufacturing method, when the hard layer is to be formed on the surface of the tool, the amount of bonding-phase metals contained in the hard layer can be reduced, for example, to not greater than 11% by weight, to thereby suppress exudation of bonding-phase metals into the sintered skin.

The method of the present invention specifies nitrogen as an atmospheric gas for use in cooling, for the following reason. By introducing nitrogen gas, for example, 4A-, 5A- and 6A-group components of the surface of the tool are nitrided to thereby form a nitriding phase composed of nitrides of 4A-, 5A- and 6A-group components. The nitriding phase shows poor wettability to bonding-phase metal components, so that exudation of bonding-phase metals into the surface of a sintered body is suppressed.

A temperature-lowering time of 15 to 25 minutes is employed for the following reason. When the temperature-lowering time is less than 15 minutes, the effect of suppressing exudation of bonding-phase metals becomes insufficient. When the temperature-lowering time is in excess of 25 minutes, a graphite phase is formed.

If the compact is sintered at a temperature of 1400° C. to 1600° C. in a pressure-reduced atmosphere (for example, in an inert gas other than nitrogen), sufficient sintering occurs.

Preferably, the method for manufacturing a cermet tool is further characterized in that the partial pressure of nitrogen in the pressure-reduced nitrogen atmosphere is 5 Torr to 50 Torr.

The partial pressure of nitrogen is limited to 5 Torr to 50 Torr for the following reason. When the partial pressure of nitrogen is not higher than 5 Torr, the effect of suppressing exudation of bonding-phase metals becomes insufficient. When the partial pressure of nitrogen is not lower than 50 Torr, excess carbon generated through nitriding, for example, of 4A-, 5A- and 6A-group components forms a graphite phase, causing an impairment in physical properties (such as strength).

Figure 1:
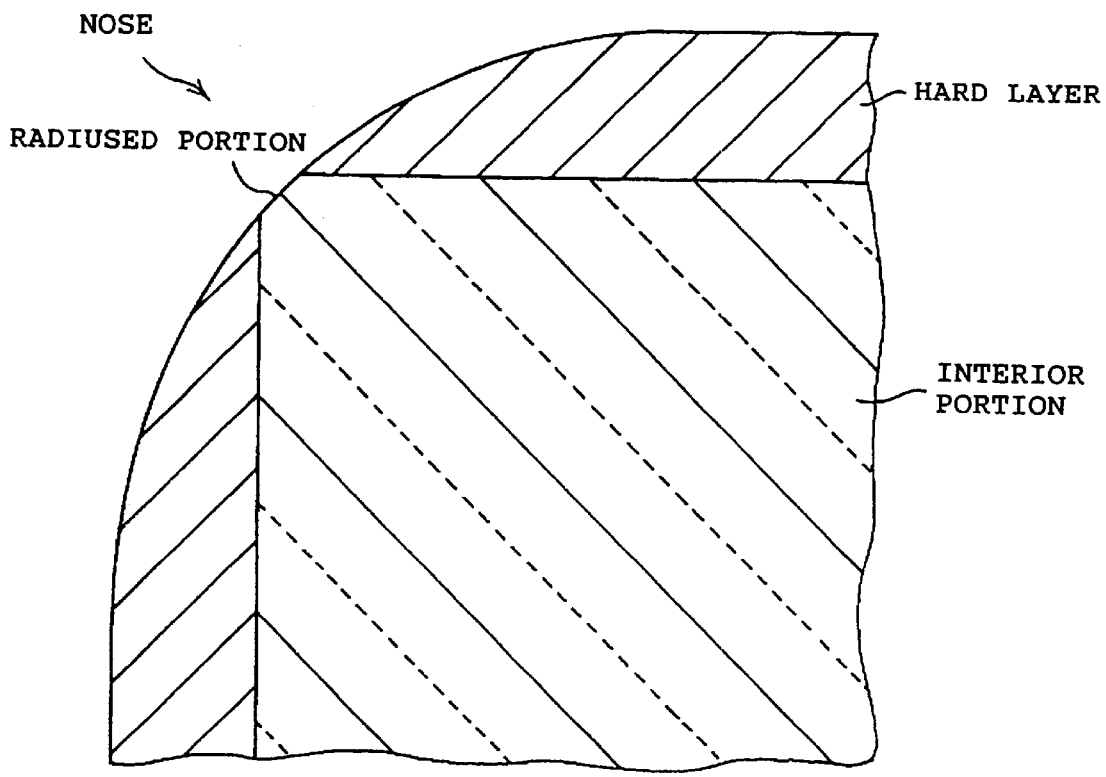
FIG. 1 is an explanatory view showing the structure of a nose of a cermet tool.
Figure 2:
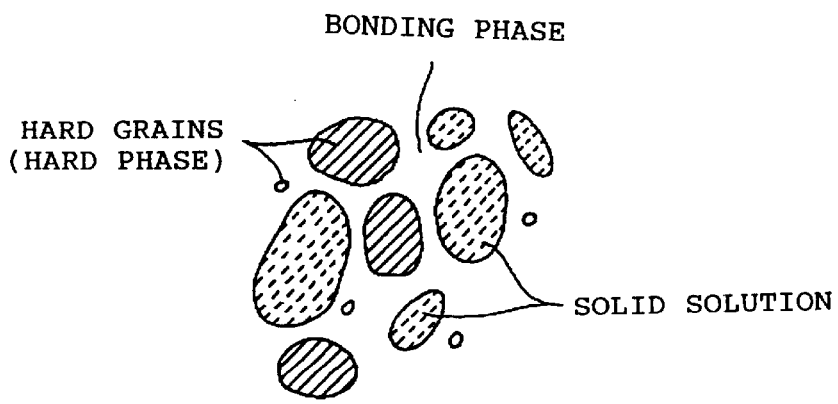
FIG. 2 is an explanatory view schematically showing the microstructure of a cermet tool.

Reference numerals are used to identify items shown in the drawings as follows:
1, 21: cermet tool (cermet tip)
3, 29: rake face
5: cutting edge
7, 23: nose
9, 27: flank
11, 31: hard layer
13, 26: interior portion
15: radiused portion
25: chamfered portion

DESCRIPTION OF THE PREFERRED EMBODIMENTS

Preferred embodiments of the invention will now be described, with reference to the drawings.

Embodiment 1 a) First, the structure of a cermet tool according to the present embodiment will be described.

Figure 3:
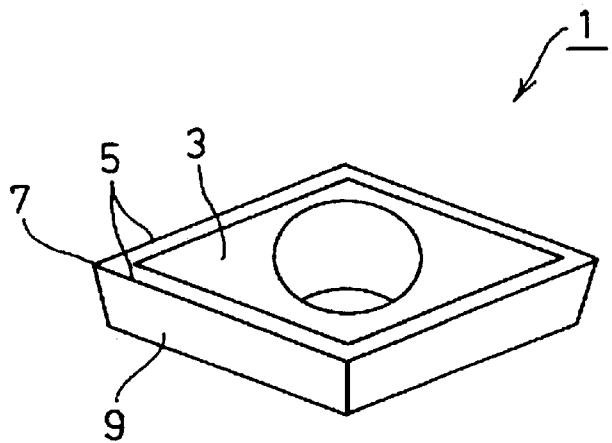
FIG. 3 is a perspective view showing a cermet tool according to embodiment 1 of the present invention.

As shown in FIG. 3, a cermet tool 1 according to the present embodiment is a cermet tip assuming a shape which complies with ISO DCMT070204.

The cermet tool 1 has a thickness of 2.38 mm. Each side (cutting edge) of a rake face 3, which is an upper face in FIG. 3, has a length of 6.88 mm. The cermet tool 1 assumes a substantially rhombic plan view such that the rhombic size reduces downward in FIG. 3. A nose 7 located at a corner of the cermet tool 1 has an acute angle (as viewed from the flank side; for example, 83°); i.e., the cermet tool 1 is a positive-type cermet tip. The upper face (rake face) 3 and all side faces (flanks) 9 of the cermet tool 1 assume the form of sintered skin.

Figure 4:
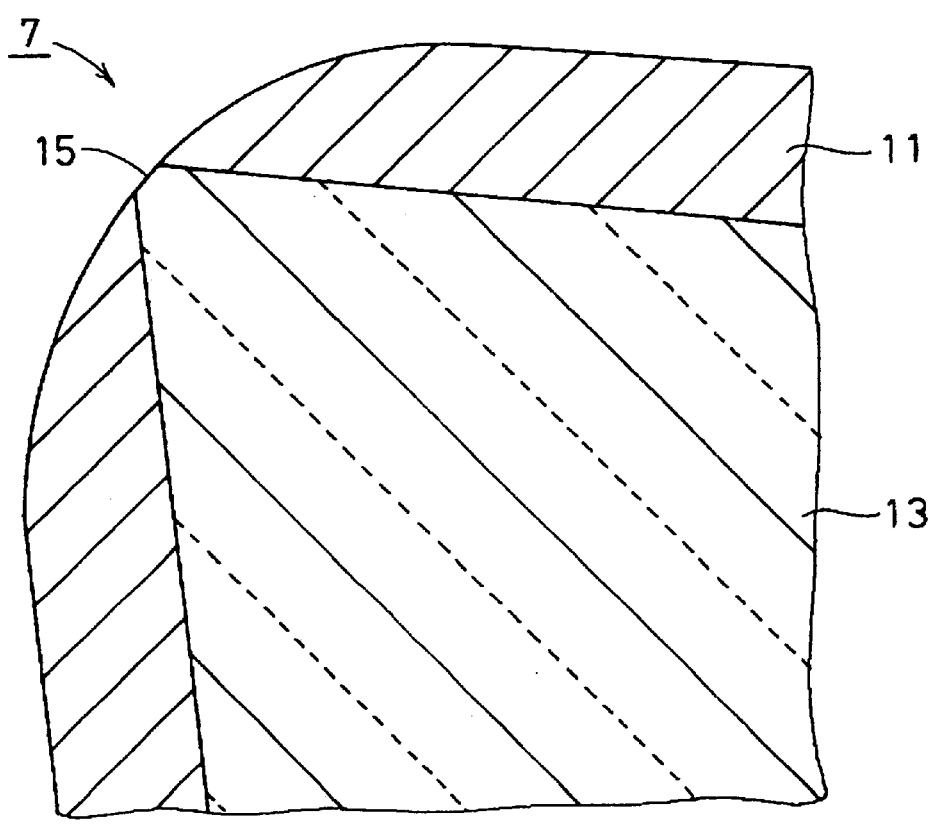
FIG. 4 is an enlarged sectional view showing a portion of the cermet tool of embodiment 1 in the vicinity of the nose.

As shown in an enlarged manner in FIG. 4, the cermet tool 1 includes a hard layer 11 which is very hard and covers the surface of the tool 1, and an interior portion 13 which is covered with and softer than the hard layer 11. FIG. 4 is a view of the cermet tool 1 as viewed from the side of the rake face 3, while the hard layer 11 of the rake face 3 is removed.

The hard layer 11 has a thickness of 2 μm to 20 μm and contains hard-phase components, such as TiCN, and bonding-phase metals, such as Fe and Ni.

Particularly, when the amount of bonding-phase metals as measured at a substantial center of the interior portion of the tool is taken as 100% by weight, the bonding-phase metals are contained in the hard layer 11 in an amount of as small as not greater than 11% by weight. The sintered skin of the surface of the hard layer 11 is substantially free of exudation of bonding-phase metals.

The interior portion 13 of the tool contains hard-phase components, such as TiCN, and bonding-phase metals. However, the hard-phase component content is lower than that of the hard layer 11, and the bonding-phase-metal content is higher than that of the hard layer 11. As a result, the interior portion 13 is softer than the hard layer 11.

The nose 7, which comes into contact with a workpiece (not shown) during cutting, is formed at a corner of the cermet tool 1.

The tip of the nose 7 is radiused through honing to a curvature having a radius of 0.04 mm to 0.16 mm so as to form a radiused portion 15 where the interior portion 13 of the tool is exposed. Accordingly, the hard layer 11 is disposed around the radiused portion (exposure portion) 15.

In the case of radiusing, the hard layer 11 around the exposure portion is also radiused. However, in the present invention, the portion at which the interior portion 13 of the tool is exposed through radiusing is referred to as a "radiused portion."

b) A method for manufacturing a cermet tool having the above-described structure will next be described.

(1) First, the following material powders were prepared: TiCN powder (TiC/TiN =50/50) having a mean grain size of 1.5 μm; TiC powder having a mean grain size of 1.0 μm; TiN powder having a mean grain size of 1.4 μm; VC powder having a mean grain size of 1.7 μm; NbCN powder having a mean grain size of 1.4 μm; TaC powder having a mean grain size of 1.6 μm; Mo₂C powder having a mean grain size of 3.3 μm; WC powder having a mean grain size of 1.6 μm; Ni powder having a mean grain size of 3.0 μm; and Co powder having a mean grain size of 1.5 μm.

These material powders were mixed according to the composition of Table 1. The resultant mixture was wetly ball-milled in acetone and then compacted at a pressure of 1.5 ton/cm² to thereby be formed into a green compact. In this manner, green compacts A to E were formed, followed by dewaxing.

(2) Next, the green compacts A to E were placed in a firing furnace in which an atmosphere of inert gas other than nitrogen gas is established under reduced pressured. The temperature of the furnace was raised to 1400° C. to 1600° C. at a rate of 5 to 15° C./min, and then the temperature was maintained for 1 hour.

Subsequently, while a nitrogen atmosphere was established under a reduced pressure of 5 Torr to 50 Torr, the temperature of the furnace was lowered at a rate of 5° C./min for 15 min to 25 min. Then, while an argon gas atmosphere was established at a pressure of 650 Torr, furnace cooling was performed, thus yielding cermet sintered-bodies (Samples A to E), which serve as example cermet tools of the present invention.

Similarly, green compacts A to E shown below in Table 1 were placed in the firing furnace and subjected to firing under conditions similar to those described above until the step of maintaining the temperature of the furnace at 1400° C. to 1600° C. for 1 hour was completed. Subsequently, without performing the step of lowering the temperature of the furnace for 15 min to 25 min, while the argon gas atmosphere was established at a pressure of 650 Torr, furnace cooling was performed, thus yielding cermet sintered-bodies (Sample Nos. 6 to 10), which serve as comparative examples.

The firing conditions and cooling conditions that were employed are shown in Table 2.

TABLE 1

| | | Composition of material (wt %) | | | | | | | | |
|---|---|---|---|---|---|---|---|---|---|---|
| | | TiC | TiN | TiCN | VC | NbC | TaC | Mo₂C | WC | Ni | Co |
| Green Com- Pact | A | — | — | 57 | 0.5 | 7.5 | — | 9 | 11 | 5 | 10 |
| | B | 35 | 22 | 0 | 0 | 0 | 4 | 9 | 18 | 4 | 8 |
| | C | 35 | 22 | 0 | 0 | 4 | 0 | 9 | 18 | 4 | 8 |
| | D | 36 | 24 | — | — | 5 | — | 9 | 18 | 2.5 | 5.5 |
| | E | 31 | 20 | — | — | — | 8 | 6 | 18 | 6 | 11 |

TABLE 2

| | | | Cooling conditions | |
|---|---|---|---|---|
| | | Sintering temperature (° C.) | Partial pressure of nitrogen (Torr) | Time (min) |
| Example | 1 | 1500 | 30 | 20 |
| | 2 | 1550 | 20 | 15 |
| | 3 | 1600 | 10 | 15 |
| | 4 | 1400 | 50 | 20 |
| | 5 | 1450 | 5 | 25 |
| Comparative example | 6 | 1500 | Furnace cooling in Ar atmosphere | |
| | 7 | 1550 | Furnace cooling in Ar atmosphere | |
| | 8 | 1600 | Furnace cooling in Ar atmosphere | |
| | 9 | 1400 | Furnace cooling in Ar atmosphere | |
| | 10 | 1450 | Furnace cooling in Ar atmosphere | |

(3) The thus-manufactured cermet sintered-bodies were examined for the amount of bonding-phase metals contained in the sintered skin by means of an energy dispersive X-ray analyzer attached to a scanning electron microscope (SEM).

Each of the cermet sintered-bodies was cut at a central portion. The cut surface was mirror-polished and was then examined for the amount of bonding-phase metals contained in a central portion and for the amount of bonding-phase metals contained in the hard layer formed in the vicinity of the sintered skin, by means of the energy dispersive X-ray analyzer attached to the scanning electron microscope.

The thickness of the hard layer was examined by observation through the scanning electron microscope.

The examination results are shown below in Table 3.

FIGS. 5(a) and 5(b) are images of a section of the cermet sintered-body of the present invention photographed by means of SEM, and FIG. 6(a) is an image of the surface of the cermet sintered-body of the present invention photographed by means of SEM. FIG. 5(a) is an the image of the section of a central portion of sample No. 1 photographed at 5000 times magnification by means of SEM; FIG. 5(b) is an the image of the section of a portion of sample No. 1 including the hard layer, photographed at 2000 times magnification by means of SEM; and FIG. 6(a) is an image of the sintered skin of sample No. 1 photographed at 2000 times magnification by means of SEM. FIG. 6(b) is an image of the sintered skin of sample No. 6 showing exuded bonding-phase metals, which is a comparative example representing the prior art, photographed at 2000 magnification by means of SEM.

(4) Next, the nose of each cermet sintered-body was honed to a curvature having a radius R of 0.08 mm, thereby completing a cermet tool assuming a shape which complies with ISO DCMT070204.

In the case of the cermet tools of Sample Nos. 1 to 5, which are examples of the present invention, the hard layer was removed from a honed portion of the nose, thereby forming a radiused portion where an interior portion of the tool is exposed. In the case of the cermet tools of Sample Nos. 6 to 10, which serve as comparative examples, the interior portion of the tool was not exposed at the radiused portion.

(5) Next, using the above-described cermet tools, a dry, high-speed, continuous cutting test was conducted under the cutting conditions specified below, so as to examine the flank wear amount VB of a flank of the tool. The flank wear VB is defined as the amount of wear along the flank of the tool tip from the original rake face level at the cutting edge formed at the intersection of the rake face and the flank face, as explained and illustrated in, for example, EP-A-0926110. The test results are shown below in Table 3. The cutting conditions were as follows.

Workpiece: round bar of JIS SNCM439 (HB300)

Cutting speed: 250 m/min

Feed rate: 0.1 mm/rev

Depth of cut: 1.0 mm cutting time: 3 min c) As seen from Tables 1 to 3, the cermet tools (Sample Nos. 1 to 5) according to the present invention were free of chipping derived from fusion, thus exhibiting excellent resistance to chipping. Also, the amount of wear VB was small, indicating excellent wear resistance.

By contrast, the cermet tools (Sample Nos. 6 to 10) serving as comparative examples suffered chipping or exhibited poor wear resistance.

Figure 5:
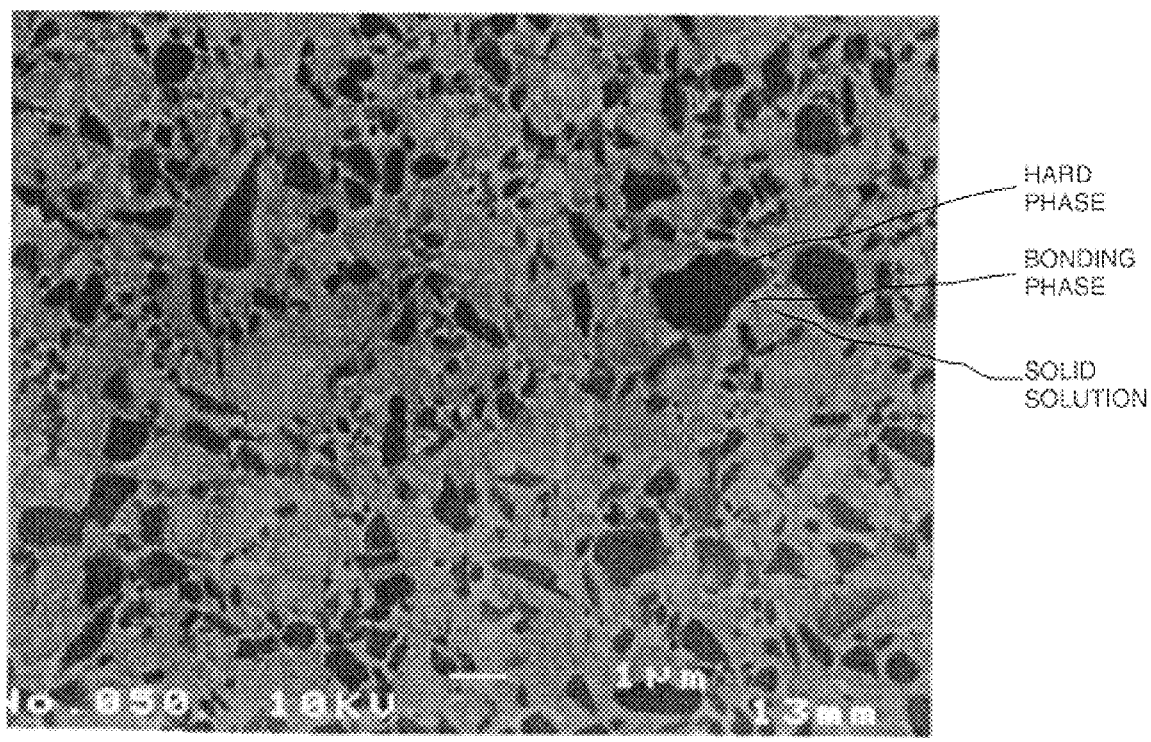
FIGS. 5(a) and 5(b) are photographs showing the microstructure of a section of a sample of a cermet sintered-body.
Figure 5:
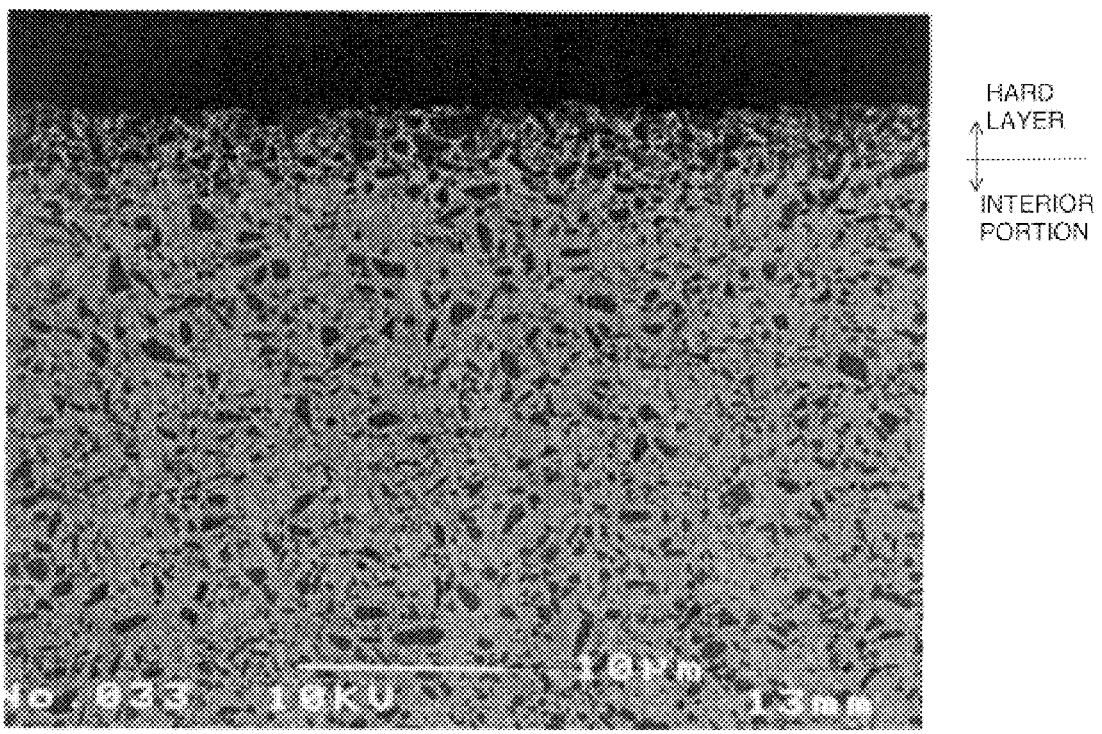
Figure 6:
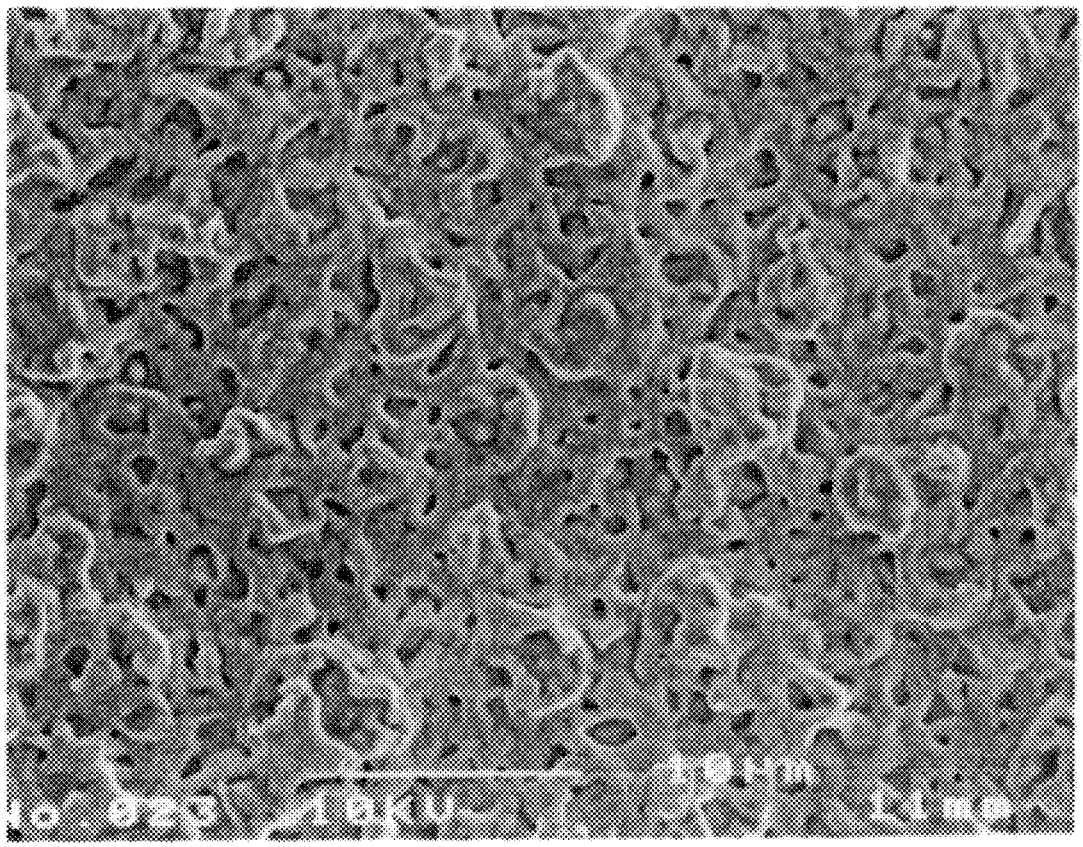
FIGS. 6(a) and 6(b) are photographs showing the microstructure of a surface of a sample of a cermet sintered-body.
Figure 6:
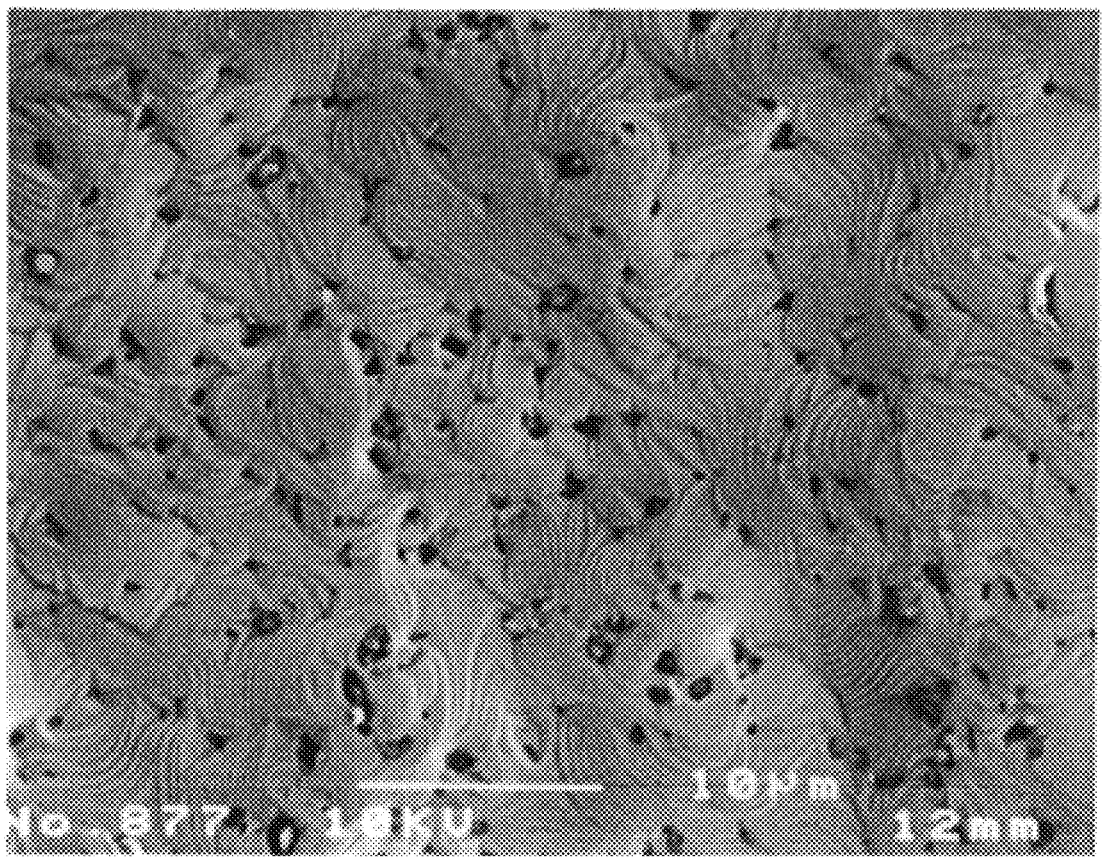

As seen from the photographs of FIGS. 5 and 6 taken using SEM, the example (Sample Nos. 1 to 5) of the present invention had a microstructure composed of a bonding phase and a hard phase. Further, a dense hard layer which contains a large amount of hard grains was formed on the surface of the sintered body. Also, no exudation of bonding-phase metals was observed on the surface of the sintered skin, see FIG. 6(a). By contrast, the comparative examples (Sample Nos. 6 to 10) showed exudation of bonding-phase metals on the surface of the sintered skin, as exemplified in FIG. 6(b) which shows almost the entire surface covered by exuded bonding-phase metal except at a few dark spots or dents.

Embodiment 2

Next, embodiment 2 will be described.

Figure 7:
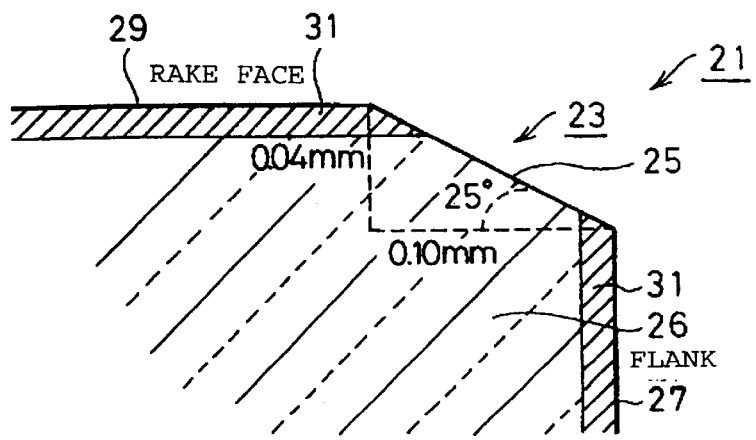
FIG. 7 is an enlarged sectional view showing a portion of the cermet tool of embodiment 2 in the vicinity of the nose.
Figure 8:
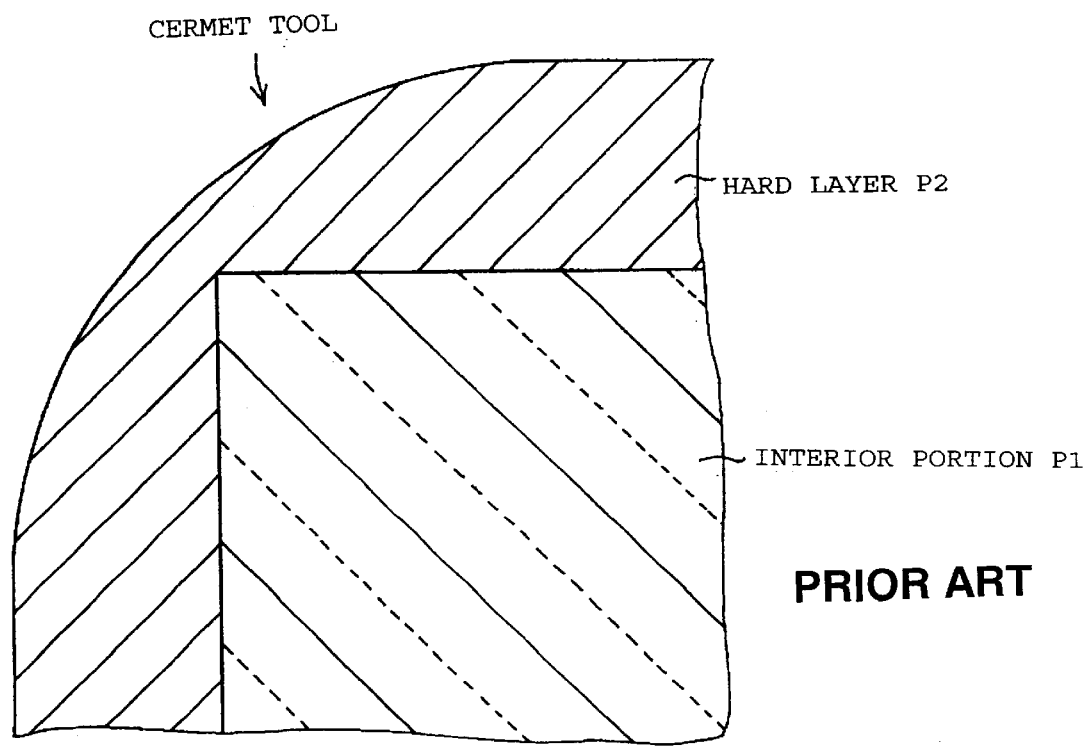
FIG. 8 is an explanatory view showing the prior art.

A cermet tool 21 according to the present embodiment differs from embodiment 1 in that in place of the radiused portion, a chamfered portion 25 is formed at the nose 23 by chamfering to thereby expose the interior portion 26 of the tool 21, as shown in FIG. 7.

The chamfered portion 25 is formed by cutting a corner portion to a flat shape such that the slant angle becomes 25°, the flank face 27 is removed by an amount of 0.04 mm, and the rake face 29 is removed by an amount of 0.10 mm. The chamfered portion 25 is formed by grinding using, for example, a diamond grinding wheel.

In the case of chamfering, the hard layer 31 around the exposure portion is also chamfered. However, in the present invention, the portion at which the interior portion 26 of the tool is exposed through chamfering is referred to as a "chamfered portion 25."

The shape of the chamfered portion 25 is generally called "TN chamfer" and is common in the field of cermet tools.

The present invention is not limited to the above-described embodiments, but may be embodied in many other specific forms without departing from the scope of the invention.

For example, the present invention is applicable to both of positive-type and negative-type cermet tips.

TABLE 3

| | | Bonding-phase metal content of surface (wt. %) | Thickness of hard layer (μm) | Bonding-phase metal content A of central portion (wt. %) | Bonding-phase metal content B of hard layer (wt. %) | Ratio B/A | Cutting performance VB (mm) |
|---|---|---|---|---|---|---|---|
| Example | 1 | 0.15 | 15 | 14.3 | 1.0 | 7 | 0.05 |
| | 2 | 1.2 | 9 | 11.4 | 1.0 | 9 | 0.05 |
| | 3 | 1.2 | 5 | 12.1 | 1.2 | 10 | 0.15 |
| | 4 | 0.1 | 20 | 7.9 | 0.3 | 4 | 0.13 |
| | 5 | 1.9 | 2 | 16.2 | 1.8 | 11 | 0.15 |
| Comparative Example | 6 | 8.2 | 40 | 14.3 | 8.9 | 62 | Chipping due to fusion |
| | 7 | 10.2 | 42 | 11.3 | 8.8 | 7.8 | Chipping due to fusion |
| | 8 | 19 | 103 | 12.2 | 11.0 | 90 | Chipping |
| | 9 | 4.6 | 31 | 8.0 | 3.5 | 44 | 0.20 |
| | 10 | 7.8 | 38 | 16.7 | 8.7 | 52 | 0.25 |

As described above, the cermet tool of the present invention includes an exposure portion which is formed at a nose and at which an interior portion of the tool is exposed, and a hard layer disposed around the exposure portion, thereby imparting excellent resistance to wear and chipping.

The method of the present invention for manufacturing a cermet tool involves, after sintering, the step of lowering the temperature for 5 min to 25 min in a nitrogen atmosphere under reduced pressure, thereby reducing the amount of bonding-phase metals contained in the hard layer and thus suppressing exudation of bonding-phase metals into the sintered skin. Thus, the above-described cermet tool having excellent resistance to wear and chipping can be manufactured.

This application is based on Japanese Patent Application Nos. Hei. 11-51516 filed Feb. 26, 1999 and 2000-28245 filed Feb. 4, 2000, the disclosures of which are incorporated herein by reference in their entirety.

What is claimed is:

1. A cermet tool containing as a bonding phase at least two iron-group metals and as a hard phase at least two members selected from the group consisting of carbides, nitrides, and carbonitrides of elements in Group 4A, 5A and 6A of the Periodic Table, comprising:

a sintered skin formed on a rake and/or flank face;

a nose formed at a corner of the cermet tool and having an exposure portion exposing the interior portion at the nose; and an interior portion beneath the sintered skin;

wherein, an amount of the bonding phase decreases from the center of the interior portion to a surface of the sintered skin so that substantially no exudation of the bonding phase metal is observed at the surface, and the amount of the bonding phase contained in the sintered surface skin having a thickness of 2–20 µm measured from the surface is not greater than 11% by weight when the amount of the bonding phase as measured substantially at the center of the interior portion of the cermet tool is taken as 100% by weight.

2. The cermet tool as claimed in claim 1, wherein said exposure portion is a radiused portion having a radius in the range of from 0.04–0.16 mm.

3. The cermet tool as claimed in claim 1, wherein said hard phase comprises a solid solution of said at least two hard phase members.

4. The cermet tool as claimed in claim 1, wherein the amount of bonding phase contained in the sintered surface skin is not greater than 1.9% by weight.

5. The cermet tool as claimed in claim 1, wherein the amount of bonding phase contained in the sintered surface skin is not greater than 1.8% by weight.

* * * * *